United States Patent [19]

Gavin

[11] 3,890,339

[45] June 17, 1975

[54] PROCESS FOR PREPARING 3-TRICHLOROMETHYL-5-ETHOXY-1,2,4-THIADIAZOLE FROM TRICHLOROACETONITRILE IN ETHANOL

[75] Inventor: David F. Gavin, Cheshire, Conn.

[73] Assignee: Olin Corporation, New Haven, Conn.

[22] Filed: May 28, 1974

[21] Appl. No.: 474,118

[52] U.S. Cl. .................... 260/302 D; 260/302 D
[51] Int. Cl. .................................... C07d 91/60
[58] Field of Search ........................... 260/302 D

[56] References Cited
UNITED STATES PATENTS 3,260,725    7/1966    Schroeder ............... 260/302 D Primary Examiner—R. J. Gallagher
Attorney, Agent, or Firm—Robert L. Andersen

[57] ABSTRACT

A process is provided for preparing 3-trichloromethyl-5-ethoxy 1,2,4-thiadiazole directly from trichloroacetonitrile without isolation of intermediates in ethanol which serves both as solvent and reactant.

1 Claim, No Drawings

PROCESS FOR PREPARING 3-TRICHLOROMETHYL-5-ETHOXY-1,2,4-THIADIAZOLE FROM TRICHLOROACETONITRILE IN ETHANOL

BACKGROUND OF THE INVENTION

The present invention relates generally to a process for preparing 3-trichloromethyl-5-ethoxy-1,2,4-thiadiazole. In particular the present process is directed to a method for preparing 3-trichloromethyl-5-ethoxy-1,2,4-thiadiazole from trichloroacetonitrile utilizing a series of reactions in a single solvent system without isolating intermediate compounds.

The uses for 3-trichloromethyl-5-ethoxy-1,2,4-thiadiazole are well known to those skilled in the art. It and its derivatives are biocides which are effective against fungi, nematodes, and in controlling weeds. It is particularly effective as a soil fungicide which functions in the soil to protect seeds and growing plants against such pathogenic fungi as Pythium, Fusarium, Rhizoctonia, and Sclerotium.

Heretofore, 3-trichloromethyl-5-ethoxy-1,2,4-thiadiazole was prepared by a complex series of reactions which required isolation of various intermediates following each of the several steps. Acetonitrile was chlorinated to form trichloroacetonitrile. The trichloroacetonitrile was isolated and ammoniated to form trichloroacetamidine. Trichloroacetamidine was then isolated and dissolved in a water immiscible organic solvent such as methylene chloride. Trichloromethanesulfenyl chloride was added to this mixture and reacted with trichloroacetamidine to form a trichloroacetamidine adduct and trichloroacetamidine hydrochloride. The reaction mixture was then treated with caustic to affect ring closure of the adduct, to convert trichloroacetamidine hydrochloride back to the trichloroacetamidine base and to form more adduct which was in turn cyclized to 3-trichloromethyl-5-chloro-1,2,4-thiadiazole. 3-Trichloromethyl-5-chloro-1,2,4-thiadiazole was then isolated and reacted with sodium ethylate in the presence of ethanol to produce 3-trichloromethyl-5-ethoxy-1,2,4-thiadiazole which was then isolated by vacuum distillation of the reaction zone. This process for preparing 3-trichloromethyl-5-ethoxy-1,2,4-thiadiazole is described in Schroeder, U.S. Pat. Nos. 3,260,588 and 3,260,725, examples 1 and 2.

I have now discovered that the entire sequence of reactions starting with trichloroacetonitrile and ending with isolation of 3-trichloromethyl-5-ethoxy-1,2,4-thiadiazole may be conducted in an ethanol solvent without isolating any intermediate products as required by the prior process. This method for preparing 3-trichloromethyl-5-ethoxy-1,2,4-thiadiazole is particularly advantageous in that the entire sequence of reactions may be conducted in a single reaction vessel. Also the use of multiple and sometimes expensive solvents, particularly organic solvents, is avoided. Quite advantageously the solvent, ethanol, acts as a reactant as well as a solvent. Finally, recovery of trichloroacetamidine and 3-trichloromethyl-5-chloro-1,2,4-thiadiazole is not required. There is required only a single recovery step at the completion of the entire sequence of reactions. Avoidance of intermediate isolations results in very substantial savings in this process.

SUMMARY OF THE INVENTION

In accordance with the present invention, a process is provided for preparing 3-trichloromethyl-5-ethoxy-1,2,4-thiadiazole from trichloroacetonitrile comprising the steps of (1) reacting trichloroacetonitrile with ammonia in the presence of at least a solvent amount of ethanol, (2) adding trichloromethanesulfenyl chloride to the reaction mixture of step 1 in an amount sufficient to produce a trichloromethanesulfenyl chloride to trichloroacetonitrile molar ratio of 1:1 to 10:1 and permitting the reaction to proceed at least until the resulting exotherm has ceased, (3) thereafter adding to the slurry resulting from step 2 sufficient base selected from the group consisting of alkali metal or ammonium hydroxide, carbonate and bicarbonate to provide 3–10 equivalents of alkali metal or ammonium ion per mole of trichloroacetonitrile, and recovering 3-trichloromethyl-5-ethoxy-1,2,4-thiadiazole.

DETAILED DESCRIPTION OF THE INVENTION

In accordance with the present invention trichloroacetonitrile is first reacted with ammonia in the presence of ethanol. Suitably, anhydrous ammonia may be dissolved in ethanol and trichloroacetonitrile added with agitation. Alternatively, trichloroacetonitrile may be dissolved in ethanol and ammonia bubbled through the trichloroacetonitrile/ethanol mixture. Where ammonia is first dissolved in ethanol, ammonia may be employed in amounts sufficient to create a 10–25 percent by weight solution of ammonia in ethanol. The amount of ammonia utilized should be at least equivalent, on a molar basis, to the amount of trichloroacetonitrile employed. Suitably, 1–10 moles, preferably 1–6 moles of ammonia are employed for each mole of trichloroacetonitrile in or added to the starting reaction mixture. The reaction between trichloroacetonitrile and ammonia proceeds readily at room temperature or below, suitably −40°C. to 30°C., preferably −20°C. to 25°C.

The amount of ethanol utilized may vary widely. However, it is theoretically required to have present one mole of ethanol per mole of trichloroacetonitrile. An additional amount, however, is required, and we have found it desirable to employ at least sufficient ethanol to provide an ethanol to trichloroacetonitrile weight ratio of at least 1:1, suitably 1:1-1:100, preferably 1:1.5 to 1:25. Below the lower limits of this range, the slurry becomes difficult to handle, but the upper limit is a matter dictated primarily by economic considerations. For example, it is desirable to recover excess ethanol and recycle it to a succeeding batch. Where vacuum stripping methods are employed in product work-up, recovery of ethanol can be expensive and time consuming if excessive quantities are employed. Accordingly, the lower portion of this range is most suitable at least unless other methods of product recovery are employed.

Assuming a molar excess of ammonia has been employed in ammoniating trichloroacetonitrile it is desirable to eliminate the excess from the reaction mixture prior to addition of trichloromethanesulfenyl chloride. This may be accomplished in any known manner. For example, the reaction mixture may be purged with nitrogen or heated to eliminate most of the excess ammonia.

Thereafter, trichloromethanesulfenyl chloride is added to the ammoniated reaction mixture which at this point contains principally trichloroacetamidine and ethanol. It was quite surprising to find that trichloromethanesulfenyl chloride reacted preferentially with the trichloroacetamidine present in the reaction mixture in the presence of excess ethanol. Suitably, trichloromethanesulfenyl chloride is employed in an amount sufficient to produce a trichloromethanesulfenyl chloride to trichloroacetonitrile molar ratio of at least 1:1, advantageously 1:1 to 10:1 and preferably 1:1 to 5:1. Desirably, the trichloromethanesulfenyl chloride is added slowly to the reaction mixture, preferably with stirring. Suitably the desired amount of trichloromethanesulfenyl chloride may be added over a period of 0.25-4 hours, preferably 0.5-2 hours. The reaction between trichloromethanesulfenyl chloride and the amidine solution may be conducted at any desired temperature. Suitably the reaction temperature may be −40°C. to 50°C., preferably −20°C. to 30°C.

As trichloromethanesulfenyl chloride is added to the reaction mixture a marked exotherm is noted. This exotherm continues until substantially all trichloroacetamidine in the reaction mixture has been consumed by reaction with trichloromethanesulfenyl chloride.

The reaction mixture is then allowed to stand at least until the exotherm ceases. Suitably a post addition reaction time of ¼ to 2 hours may be utilized to permit the reaction to proceed to completion.

Thereafter, the resulting slurry is treated with a base to affect ring closure. Suitably a base selected from the group consisting of alkali metal or ammonium hydroxide, carbonate and bicarbonate may be employed for this purpose. Suitably, excess base is employed in order to neutralize HCl formed during ring closure and ethoxylation. On a theoretical basis at least four equivalents of alkali metal or ammonium is required for each mole of trichloroacetonitrile employed. Suitably, therefore, the base is used in amounts needed to provide 3 to 10, preferably 3.5 to 7 equivalents of alkali metal or ammonium ion per mole of trichloroacetonitrile.

Preferably, the selected base is added as an alcoholic solution of said base, preferably slowly and preferably with agitation. The base is suitably added over a period of 0.5 to 4 hours, preferably 1 to 3 hours with sufficient agitation to prevent localized concentrations of base in the reaction mixture.

Following base addition the 3-trichloromethyl-5-ethoxy-1,2,4-thiadiazole may be recovered by any suitable means. For example, the reaction mixture may be filtered to remove NaCl and the filtrate vacuum topped to produce 3-trichloromethyl-5-ethoxy-1,2,4-thiadiazole.

Having thus described my invention, the following example is illustrative of the method.

EXAMPLE I

To 36g (2.1 mole) anhydrous $NH_3$ in 200ml anhydrous 2B ethanol 50g (0.35 mole) trichloroacetonitrile was added with stirring at 0°C. The reaction mixture was purged for 1 hour at 30°C. with nitrogen and cooled to 0°C. Trichloromethanesulfenyl chloride, 65.6g (0.35 mole) was then added over a period of 0.5 hours while controlling the temperature at 0°C. The reaction was exothermic and solids precipitated during the addition of trichloromethanesulfenyl chloride. The resulting slurry was then treated with a solution of 55.7g (1.39 mole) NAOH in 450ml abs. ethanol at 0°C. using a 3-hour addition time. The reaction mixture was allowed to come to room temperature, filtered and the filtrate concentrated under reduced pressure to give an oily solid. The product was identified as 3-trichloromethyl-5-ethoxy-1,2,4-thiadiazole by VPC and Mass Spec.

We claim:
1. A process for preparing 3-trichloromethyl-5-ethoxy-1,2,4-thiadiazole comprising:
  1. Reacting trichloroacetonitrile with ammonia in the presence of sufficient ethanol to provide a weight ratio of ethanol to trichloroacetonitrile of 1:1 to 100:1;
  2. Adding trichloromethanesulfenyl chloride to the reaction mixture of step 1 in an amount sufficient to produce a trichloromethanesulfenyl chloride/trichloroacetonitrile molar ratio of 1:1 to 10:1 and permitting the reaction to proceed at least until the resulting exotherm has ceased;
  3. Thereafter adding a base selected from the group consisting of alkali metal or ammonium hydroxide, carbonate, and bicarbonate to the slurry resulting from step 2, said base being an added in an amount sufficient to provide 3 to 10 equivalents of alkali metal or ammonium ion per mole of trichloroacetonitrile, and thereafter recovering 3-trichloromethyl-5-ethoxy-1,2,4-thiadiazole.

* * * * *

PO-1050
(5/69)

UNITED STATES PATENT OFFICE
CERTIFICATE OF CORRECTION

Patent No. 3,890,339            Dated    June 17, 1975

Inventor(s)    David F. Gavin

It is certified that error appears in the above-identified patent and that said Letters Patent are hereby corrected as shown below:

Column 1, line 46, "zone" should read --mixture--.

Column 4, line 44, "being an added" should read --being added--.

Signed and Sealed this thirtieth Day of September 1975

[SEAL]

Attest:

RUTH C. MASON
*Attesting Officer*

C. MARSHALL DANN
*Commissioner of Patents and Trademarks*